United States Patent Office 3,142,059
Patented July 21, 1964

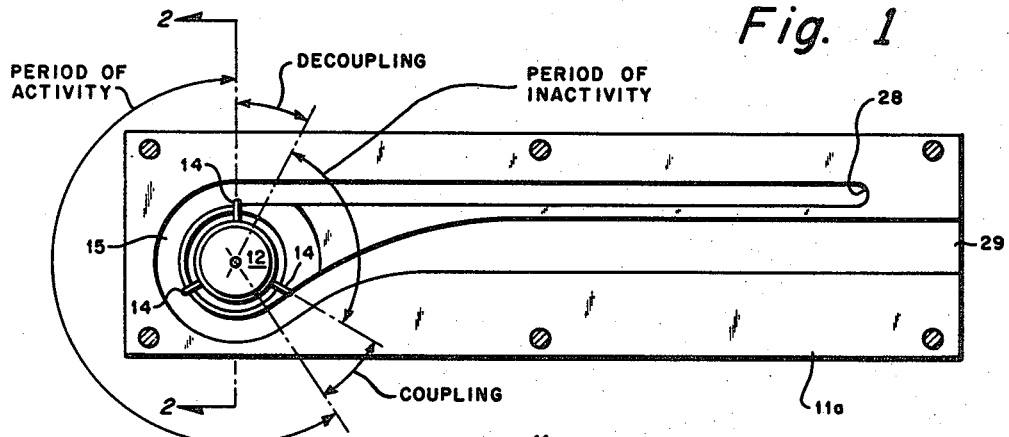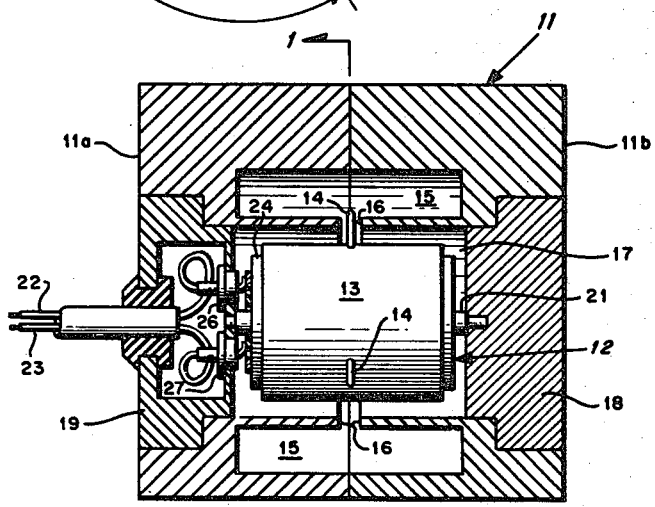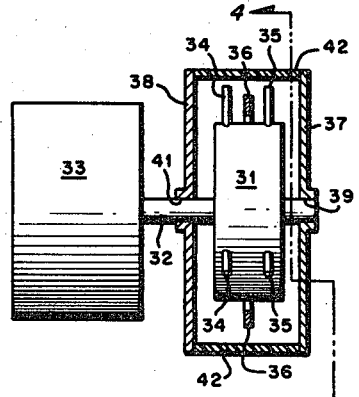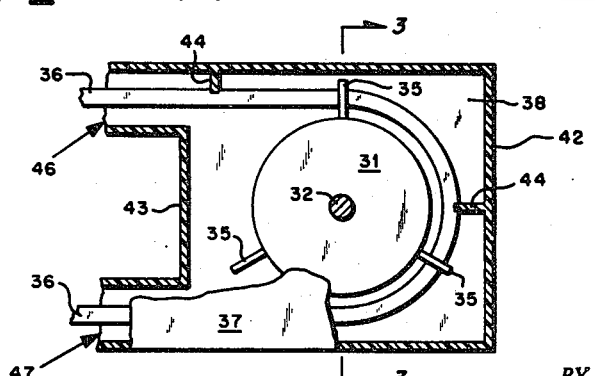

3,142,059
DOPPLER SIMULATOR
Robert L. Williston, Amherst, N.H., assignor, by mesne assignments, to the United States of America as represented by the Secretary of the Navy
Filed Nov. 28, 1961, Ser. No. 155,516
7 Claims. (Cl. 343—17.7)

The present invention relates to microwave reflectors and more particularly to a microwave doppler simulator.

The doppler principle is widely used in radar systems for obtaining accurate information as to the position, speed, and direction of a moving target. Such information is given by the change in the frequency between a transmitted and received wave which is reflected from the moving target. With the development of doppler radar systems it has become necessary to develop at the same time devices which simulate the doppler frequency. These devices are necessary for the testing and calibration of radar systems, and in the training of personnel in the use of radar doppler systems.

Various systems are in use today for simulating doppler frequency. These systems utilize various techniques including wholly electronic doppler simulators, microwave reflector doppler simulators, and combinations of the electronic and microwave type reflectors.

The electronic systems generate a reference frequency which is representative of the transmitted wave and with the use of phase shifting networks displace the phase of the reference frequency to provide a second frequency signal having a frequency different from the reference frequency. The difference in frequency between the two signals is representative of the speed of a simulated moving target.

The second common type doppler simulator utilizes microwave reflecting means within a wave guide. This type of doppler simulator utilizes vanes or reflector pins within the wave guide, which move relative to the wave guide so that incoming microwaves are reflected back through the wave guide displaced in phase from the incoming microwave. Thus the incoming and outgoing waves differ in frequency and simulate the doppler effect of waves reflected from a moving target. The degree of phase shift between the incoming and outgoing waves or the difference in frequency therebetween is a function of the rate at which the reflector vanes or pins are caused to move relative to the wave guide.

A disadvantage of this type of doppler simulator is that the phase shift has a tendency to be erratic and distortion is introduced due to amplitude modulation which occurs when the source of reflection is made to couple with and decouple from the energy present on the transmission line.

Therefore, it is an object of the present invention to provide a doppler simulator in which the phase shift is continuous and in which distortion due to amplitude modulation is substantially eliminated.

Another object of the present invention is a doppler simulator in which the period of coupling by the reflectors with the energy in the transmission line is made equal to the period of decoupling.

Another object of the present invention is to provide a doppler simulator in which the period of coupling of one reflector is accompanied by a period of decoupling by a second reflector.

A further object of the present invention is to provide a modified microwave doppler simulator for use in an air-filled triplate transmission line.

Yet another object of the present invention is to provide a microwave doppler simulator which is simply constructed and which is small and compact in size.

With these and other objects in view, as will hereinafter more fully appear and which will be more particularly pointed out in the appended claims, reference now is made to the following description taken in connection with the accompanying drawings in which:

FIG. 1 is a view of one-half of a first embodiment of the doppler simulator of this invention with the wave guide portion taken through line 1—1 of FIG. 2.

FIG. 2 is a sectional view of the simulator taken through line 2—2 of FIG. 1 with the other half of the wave guide section added.

FIG. 3 is a view partly in section of a second embodiment of the present invention taken through line 3—3 of FIG. 4.

FIG. 4 is a view of FIG. 3 taken along line 4—4 of FIG. 3.

Referring now to the drawing wherein like reference characters designate like or corresponding parts throughout the various views there is shown in FIGS. 1 and 2 a microwave doppler simulator comprising a motor 12 having a fixed rotor 24 and rotatable stator 13. Centrally located on the stator periphery are three equally spaced pin-like microwave reflectors 14. These pin-like reflectors may be attached to the stator 13 in any convenient manner and are rotatable therewith.

The waveguide 11 is formed by fitting together two solid portions 11a and 11b. The portions 11a and 11b together form a hollowed out portion 15 which forms the waveguide.

As seen more clearly in FIG. 1, the hollow portion or waveguide 15 encircles the stator 13 over two-thirds of its surface. The two portions 11a and 11b also form a slot 16 when fitted together to accommodate the reflector pins 14. The slot extends slightly more than two-thirds of the distance by which the waveguide encircles the stator 13. Thus, as the stator 13 rotates, the pins 14 enter and leave the waveguide 15 through the slot 16. Each of the reflector pins 14 are within the waveguide during two-thirds of each cycle of rotation of stator 13.

The motor 12 is positioned in a compartment 17 formed by portions 11a and 11b and side portions 18 and 19. The rotor 24 is mounted on a shaft 21 which is journaled and fixed against rotation in end portions 18 and 19, respectively, in any convenient manner.

The motor receives electrical energy via the terminals 22, 23 which extend through sidewall 19 and connect to the rotor 24 through brush-type connectors 26 and 27, respectively.

The waveguide 15 terminates at end 28 which is properly matched and which may contain an attenuating microwave absorber. Element 11 has an opening 29 through which the microwave energy to be reflected by pins 14 is transmitted.

Electrical energy in the form of microwaves is coupled to the doppler simulator at opening 29 and microwaves are transmitted through waveguide 15 and are reflected by the pins 14. The waves pass out again through opening 29 with a frequency different from the frequency of the microwaves put into waveguide 15. The difference in frequency is a function of the rate of rotation of stator 13.

Reflector pins 14 are spaced one-half wavelength apart. Each pin has a period of activity or reflection period which covers two-thirds of the cycle of rotation of the stator 13 as shown in FIG. 1. In operation a reflector pin begins to decouple from the microwave energy simultaneously with the coupling of a second reflector pin. The periods of the coupling and decoupling for any two pins are equal in length and occur at the same rate. Thus, any distortion due to amplitude modulation by one pin coupling with the microwave source is virtually eliminated by an equal and opposite distortion due to the other pin decoupling at the same time.

Sections 11a and 11b which together form the transmission channel or waveguide 15 may be secured together in any convenient manner as, for example, by force pins.

FIGS. 3 and 4 show a second embodiment of the present invention adapted to be used with a triplate type transmission line.

A triplate microwave transmission line is derived from a coaxial microwave transmission line in which the inner conductor is flattened and the outer conductor is cut in two and flattened to form two outer conductors. The flat portions of each of the conductors are parallel and the width dimension of the outer conductors is large compared with the width dimension of the inner conductor.

The doppler simulator of FIGS. 3 and 4 is adapted for use with a triplate microwave transmission line. The rotor 31, mounted on a shaft 32 and adapted to be rotated therewith by means of a motor 33, has two sets of reflector pins 34 and 35. The sets of pins 34 and 35 are mounted on rotor 31 substantially as shown and rotate therewith. The sets of pins 34 and 35 each comprise three pins spaced equally about the periphery of the rotor 31.

In this embodiment, the inner conductor 36 is made to encircle the rotor 31 with its shortest dimension parallel to but not touching the periphery of rotor 31. The inner conductor 36 is positioned midway between the two sets of reflector pins 34 and 35. The sets of pins 34 and 35 overlap or extend beyond the inner conductor 36 substantially as best seen in FIG. 4. The outer conductors 37 and 38 in the area of the doppler simulator itself are actually plate portions. The end plates 37 and 38 have holes 39 and 41 to allow shaft 32 to pass therethrough and rotate relative to the plates 37 and 38 and inner conductor 36. The plates 37 and 38 are supported as by end walls 42 and 43 composed of a dielectric material. The inner conductor 36 is held in place by projections 44 of the end wall 42. These projections are also of a dielectric material so as not to interfere with the actual microwave transmission.

The doppler simulator as best seen in FIG. 4 extends into an ordinary triplate transmission line at 46 and 47. The plates 37 and 38 are used for convenience in construction but in actual theory the configuration of the doppler simulator would be a triplate transmission line wrapped around the rotor 31 in such a way that the pins 35 and 34 sandwich the inner conductor.

In this configuration of the doppler simulator of this invention modulation or distortion due to rotating parts is substantially eliminated since similar disturbances on each side of the line cancel out the distortion and thereby maintain a balanced condition. If the microwaves enter the doppler simulator as through extension 46 they will be reflected out through extension 46 being displaced in phase continuously an amount dependent on the rotation rate of the rotor 31. The frequency of the exiting microwaves will be different from the frequency of the entering microwaves and the doppler effect is thereby simulated. The extension 47 may be terminated in a matched impedance.

Obviously, many modifications and variations of the present invention are possible in the light of the above teachings. It is therefore to be understood that within the scope of the appended claims the invention may be practiced otherwise than as specifically described.

What is claimed is:

1. A doppler simulator, comprising in combination: a rotor, microwave reflector means forming a plurality of protuberances mounted on the periphery of said rotor, a rectangular wave guide encircling two-thirds of the periphery of said rotor, slot means in the broad face of said waveguide adjacent said rotor for receiving said protuberances, whereby one of said protuberances enters said waveguide simultaneously and at the same rate as another leaves said waveguide.

2. A doppler simulator, comprising in combination: a wave guide, rotatable drum means, three reflector pins mounted on said drum means, said pins being equally spaced about the periphery of said drum means and rotatable therewith, means for rotating said drum means, said wave guide encircling two-thirds of the cylindrical surface of said drum means, slot means in the wall of the wave guide closest to said drum whereby each of said reflector pins remains in said waveguide during two-thirds of each rotation of said drum means and enters and leaves said wave guide at the same rate as each other reflector pin when said drum means is rotated.

3. A doppler simulator, comprising in combination: a rotor, means for rotating said rotor, a plurality of equally spaced microwave reflector pins mounted on the periphery of said rotor for rotation therewith, a rectangular wave guide encircling two-thirds of the periphery of said rotor, slot means in the side of said wave guide adjacent the periphery of said rotor for allowing said reflector pins to pass into and out of said wave guide during rotation of said rotor whereby one of said reflector pins leaves said wave guide at the same time as another of said reflector pins enters said wave guide.

4. A doppler simulator, comprising in combination: a rotor, means for rotating said rotor, three equally spaced microwave reflector pins mounted about the center of the periphery of said rotor for rotation therewith, a rectangular wave guide encircling two-thirds of the periphery of said rotor, an elongated slotted opening along the length of said wave guide adjacent the periphery of said rotor for receiving said reflector pins within said wave guide whereby one of said reflector pins enters said wave guide simultaneously and at the same rate as a second of said reflector pins leaves said wave guide.

5. A doppler simulator, comprising in combination: a rotor, means for rotating said rotor, a first plurality of equally spaced microwave reflector pins mounted on the periphery of said rotor for rotation therewith, a second plurality of equally spaced microwave reflector pins mounted on the periphery of said rotor for rotation therewith, respective ones of said pins of said first plurality aligned with and equally spaced on said periphery from respective ones of said pins of said second plurality, a triplate microwave transmission line encircling one-half of said rotor having the center conductor thereof occupying the space between said first and second plurality of microwave reflector pins with the flat sides of the center conductor adjacent said first and second plurality of reflector pins respectively.

6. A doppler simulator, comprising in combination: a rotatable drum, means for rotating said drum, a first series of equally spaced microwave reflector pins alignedly mounted on the periphery of said drum for rotation therewith, a second series of equally spaced microwave reflector pins alignedly mounted on the periphery of said drum for rotation therewith, respective ones of said pins of said first series adjacent to and forming a space on said periphery between respective ones of said pins of said second series, a triplate microwave transmission line encircling one-half of said drum having a center conductor positioned between said first and second series of microwave reflector pins and an outer conductor on each side of said drum perpendicular to the axis of rotation of said drum.

7. A device for simulating a doppler frequency, comprising in combination: a triplate transmission line having an inner and two outer conductors, a rotor, a first series of reflector pins alignedly mounted on said rotor for rotation therewith, a second series of reflector pins alignedly mounted on said rotor for rotation therewith, each of said second series of reflector pins positioned adjacent to and spaced from respective ones of said first series of reflector pins, said triplate transmission line semi-circling said rotor with said first series of reflector pins interposed between a first one of said outer conductors and said inner conductor and said second series of reflector pins interposed between said inner conductor and the second of said outer conductors respectively, means connected to said rotor for rotating said rotor.

References Cited in the file of this patent
UNITED STATES PATENTS
2,683,855    Blitz ------------------ July 13, 1954